United States Patent
Son et al.

(10) Patent No.: US 9,937,856 B2
(45) Date of Patent: Apr. 10, 2018

(54) AUTOMOTIVE LAMP AND CONTROLLING METHOD FOR THE SAME

(71) Applicant: SL Corporation, Daegu (KR)

(72) Inventors: Youngho Son, Daegu (KR); Byoungki Ji, Daegu (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/606,836

(22) Filed: May 26, 2017

(65) Prior Publication Data

US 2017/0259733 A1    Sep. 14, 2017

Related U.S. Application Data

(63) Continuation of application No. 13/313,616, filed on Dec. 7, 2011, now Pat. No. 9,688,188.

(30) Foreign Application Priority Data

Jul. 8, 2011  (KR) .......................... 10-2011-0067889

(51) Int. Cl.
  *B60Q 1/26*    (2006.01)
  *B60Q 1/50*    (2006.01)
  *B60Q 1/04*    (2006.01)

(52) U.S. Cl.
  CPC ............... *B60Q 1/50* (2013.01); *B60Q 1/04* (2013.01); *B60Q 1/2607* (2013.01); *B60Q 1/2619* (2013.01); *B60Q 2400/50* (2013.01)

(58) Field of Classification Search
  CPC ... B60Q 1/50; B60Q 1/00; B60Q 1/22; B60Q 1/04; B60Q 1/2607; B60Q 1/2619; B60Q 2400/50; B60Q 2200/00
  USPC .......................................... 362/487; 340/435
  See application file for complete search history.

(56) References Cited

U.S. PATENT DOCUMENTS

| | | | | |
|---|---|---|---|---|
| 7,561,180 B2* | 7/2009 | Koike | ................... | B60Q 1/484 340/903 |
| 7,791,458 B2* | 9/2010 | Shimaoka | .............. | B60Q 1/085 340/435 |
| 2005/0117364 A1* | 6/2005 | Rennick | ................ | B60R 1/1207 362/540 |
| 2007/0222574 A1* | 9/2007 | Courts | ..................... | B60Q 1/24 340/468 |
| 2009/0052197 A1* | 2/2009 | Peters | .................. | B60Q 1/2696 362/487 |

* cited by examiner

*Primary Examiner* — Elmito Breval
*Assistant Examiner* — Jessica M Apenteng
(74) *Attorney, Agent, or Firm* — Mintz Levin Cohn Ferris Glovsky and Popeo, P.C.; Kongsik Kim; Colleen H. Witherell

(57) ABSTRACT

Disclosed is an automotive lamp and a method for controlling the same, and more particularly, to an automotive lamp capable of informing an ambient vehicle approaching from behind of a vehicle state by irradiating light forming a road pattern indicating the vehicle state to at least an area behind the vehicle, and a method for controlling the same. The automotive lamp includes a detection unit which detects a vehicle state; and lamp units, controlled by a control unit, which irradiates light forming a road pattern indicating the vehicle state to at least an area behind a vehicle.

17 Claims, 16 Drawing Sheets

AUTOMOTIVE LAMP AND CONTROLLING METHOD FOR THE SAME

CROSS-REFERENCE TO RELATED APPLICATION

This application is a continuation of U.S. patent application Ser. No. 13/313,616 filed on Dec. 7, 2011, which claims priority from Korean Patent Application No. 10-2011-0067889 filed on Jul. 8, 2010, the contents of which in its entirety are herein incorporated by reference.

BACKGROUND

1. Field of the Invention

The present invention relates to an automotive lamp and a method and system for controlling the same, and more particularly, to an automotive lamp capable of informing an ambient vehicle approaching from one side behind the vehicle of a vehicle state by irradiating light of a road pattern indicating the vehicle state to an area behind the vehicle, and a method for controlling the same.

2. Description of the Related Art

In general, vehicles includes various lamps having lighting functions for enabling a driver to easily see objects around the vehicle when driving at night and a signaling function for informing drivers of other vehicles or pedestrians about the driver's intentions. For example, a head lamp and a fog lamp are used to provide lighting functions, and blinkers, reversing lamps, stop lamps and side markers are used to provide signaling functions.

A reversing lamp is turned on which a vehicle is shifted into reverse to inform other drivers that the vehicle will be backing up so that other drivers or pedestrians can make preparations. In this case, since the reversing (backup) lamp is installed on the rear side of the vehicle, it is difficult for a vehicle approaching from a left or right side behind the vehicle to see the reversing lamp. Accordingly, accidents due to failing to recognize the reverse movement of the vehicle may occur.

Further, when a driver opens a door of the vehicle and gets out of the vehicle, another vehicle approaching from one side in front of the vehicle can see the driver getting out of the vehicle, whereas it is difficult for another vehicle approaching from one side behind the vehicle to see that the driver is getting out of the vehicle.

Accordingly, there is a demand for a system and method enabling other vehicles to easily see a situation where a vehicle is reversing or a door is opened.

SUMMARY

In view of the above, the present invention provides an automotive lamp capable of informing an ambient vehicle approaching from one side behind the vehicle of a vehicle particular state by irradiating light of a road pattern indicating the vehicle state to an area behind the vehicle, and a method for controlling the same.

The present invention also provides an automotive lamp capable of preventing occurrence of a vehicle accident by informing other vehicles of a vehicle state (e.g., backing up of the vehicle and opening of a door) through a road pattern formed by light irradiated to an area behind the vehicle, and a method for controlling the same.

The present invention also provides an automotive lamp configured to irradiate light forming a road pattern indicating a vehicle state and irradiate light forming a road pattern indicating a dangerous factor (situation) to an area behind the vehicle, and a method for controlling the same.

According to an aspect of the present invention, there is provided an automotive lamp, comprising: a detection unit configured to detect a vehicle state; and lamp units which irradiate light in the form of a road pattern indicating the vehicle state to an area in front of or behind a vehicle.

According to another aspect of the present invention, there is provided a method for controlling an automotive lamp, comprising: detecting a vehicle state; and irradiating light forming a road pattern indicating the vehicle state to an area in front of or behind a vehicle.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
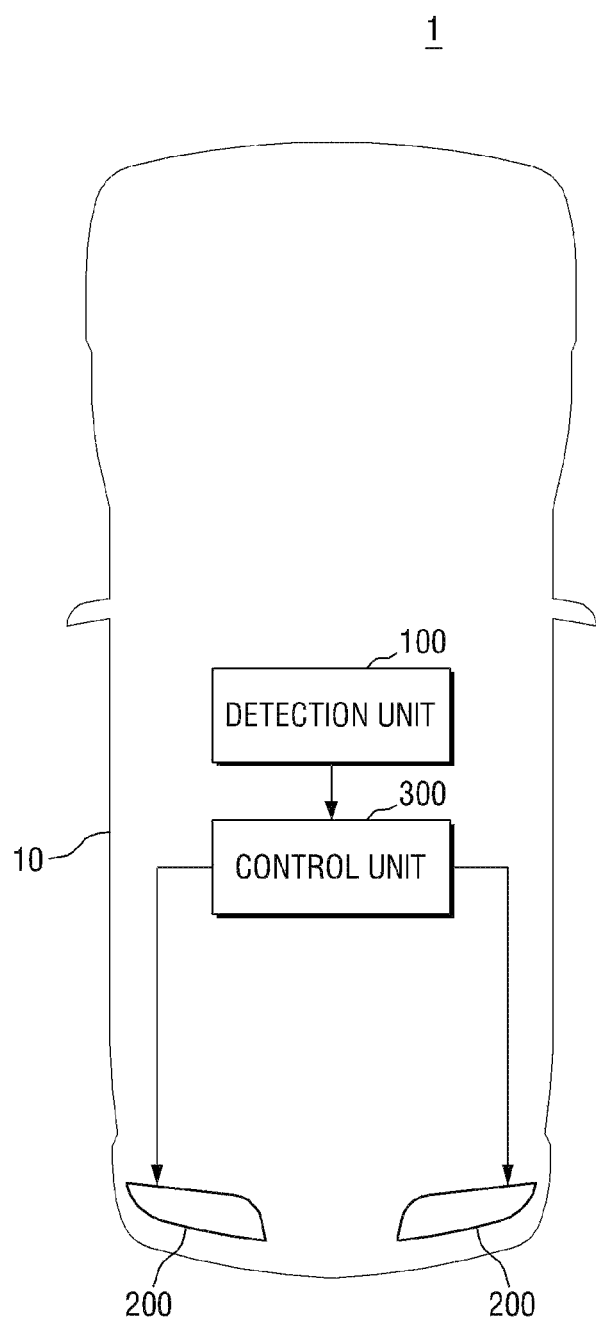
FIG. 1 schematically shows an automotive lamp in accordance with an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Throughout the specification, like reference numerals in the drawings denote like elements.

In some exemplary embodiments, well-known steps, structures and techniques will not be described in detail to avoid obscuring the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. In the drawings, respective components may be enlarged or reduced in size for convenience of explanation.

Hereinafter, an automotive lamp and a method for controlling the automotive lamp in accordance with exemplary embodiments of the present invention will be described with reference to the accompanying drawings.

FIG. 1 schematically shows an automotive lamp in accordance with an exemplary embodiment of the present invention. As shown in FIG. 1, the automotive lamp 1 in accordance with the exemplary embodiment of the present invention may include a detection unit 100 configured to detect a state of a vehicle 10, lamp units 200 which are installed on the rear side of the vehicle 10 and irradiate light of a road pattern indicating a state of the vehicle 10 to inform an ambient vehicle approaching from behind the vehicle 10 on one side, and a control unit 300 configured to control the road pattern according to the detection results of the detection unit 100.

The detection unit 100 may detect a vehicle state of the vehicle 10. In the exemplary embodiment of the present invention, the vehicle state may include a reverse idle state (i.e., a state where the vehicle 10 is stopped, but a reverse shift stage is selected), a reverse state, a door open state and the like. However, it is merely one example to facilitate understanding of the present invention, and it is not limited thereto. The detection unit 100 may detect various states where a vehicle accident between the vehicle 10 and an ambient vehicle approaching from one side behind the vehicle 10 is likely to occur.

Further, in the exemplary embodiment of the present invention, the reverse state may include a reverse (backup) movement due to selection of a reverse shift stage, a reverse movement due to an external factor and the like. The reverse movement due to an external factor may include a case where the vehicle 10 is pulled downward on an inclined road, and the like.

Figure 2:
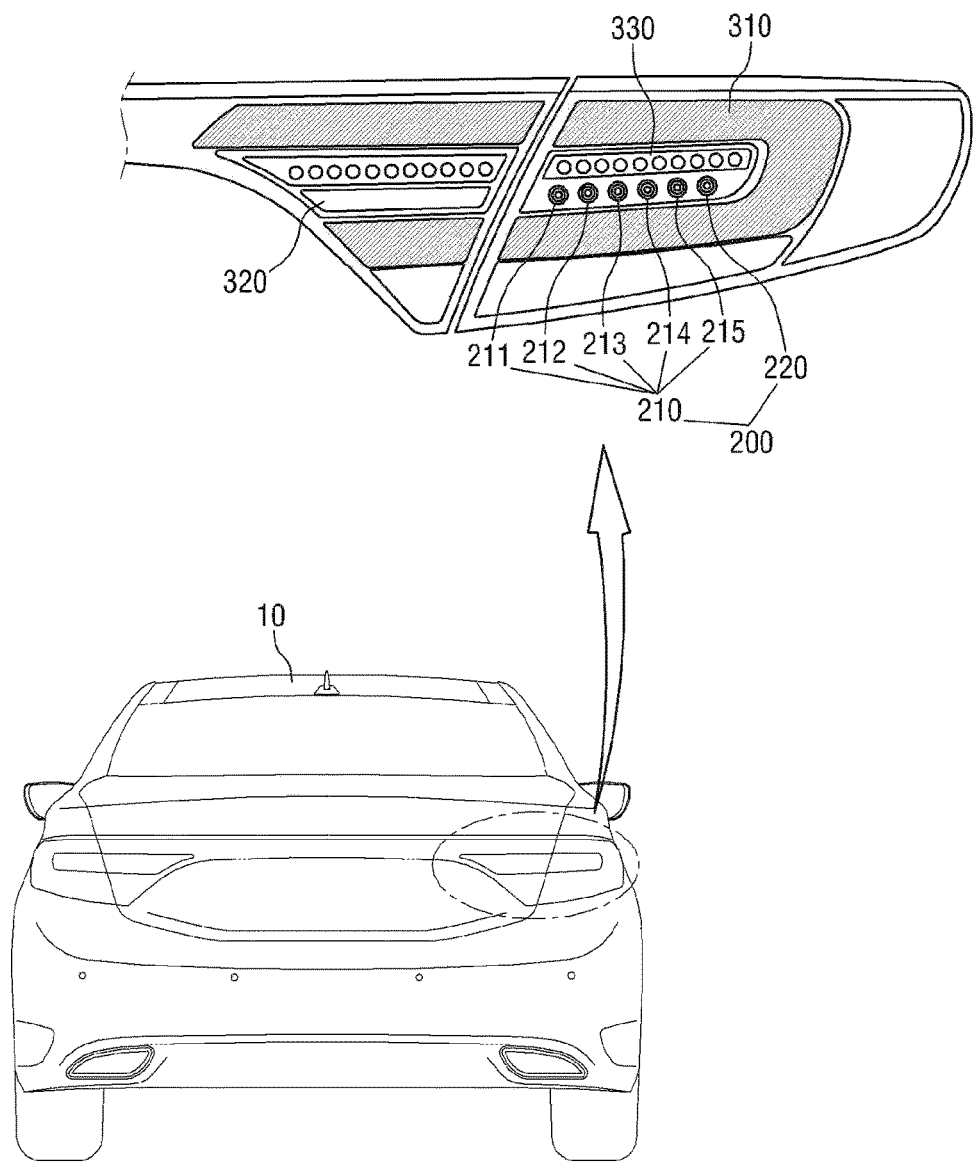
FIG. 2 schematically shows lamp units in accordance with the exemplary embodiment of the present invention.

Each of the lamp units 200 may be installed on one rear side of the vehicle 10 and irradiate light in the form of a road pattern indicating the vehicle state according to the detection results of the detection unit 100. For example, as shown in FIG. 2, a stop (brake) lamp 310, a reversing (backup) lamp 320, a blinker (signal light) 330 and the like in addition to the lamp units 200 may be installed on the rear side of the vehicle 10.

When the vehicle 10 is backing up/reversing, the reversing lamp 320 is turned on to inform an ambient vehicle approaching from behind the vehicle 10 of the reverse movement, thereby allowing a driver of the ambient vehicle to make preparations for the reverse movement of the vehicle 10. In this case, the ambient vehicle approaching behind the vehicle 10 can see the reversing lamp 320 of the vehicle 10 and make preparations accordingly. However, since an ambient vehicle approaching from a left or right side behind the vehicle 10 cannot easily see the reversing lamp 320, a vehicle accident may still occur if the vehicle implemented with the conventional lamp designs.

Accordingly, the lamp units 200 in accordance with the exemplary embodiment of the present invention is configured to irradiate light in the form of a road pattern indicating a reverse state of the vehicle 10 together with the reversing lamp 320 when the vehicle 10 is backing up, thereby allowing not only an ambient vehicle approaching from behind the vehicle 10, but also an ambient vehicle approaching from a left or right side from behind the vehicle 10 to easily see the reverse state of the vehicle 10 due to the road pattern and make preparations accordingly.

Each of the lamp units 200 in accordance with the exemplary embodiment of the present invention may include a first lamp unit 210 and a second lamp unit 220. The first lamp unit 210 may include a plurality of light source parts 211 to 215. By adjusting the size, installation angle and focal length of each of the light source parts 211 to 215, it is possible to irradiate light of a desired road pattern to an area behind the vehicle 10. It should be noted that although the first lamp unit 210 includes five light source parts 211 to 215 in the exemplary embodiment of the present invention, the number of light sources included in the first lamp unit 210 may be changed according to purpose and need.

Figure 3:
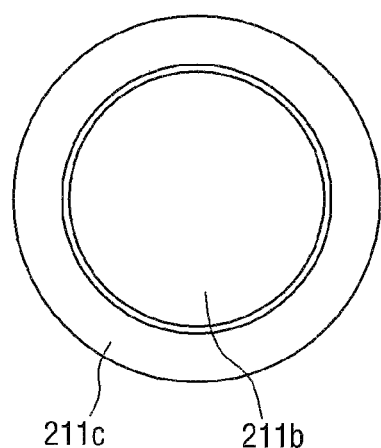
FIG. 3 is a front view of a light source part of a first lamp unit in accordance with the exemplary embodiment of the present invention.
Figure 4:
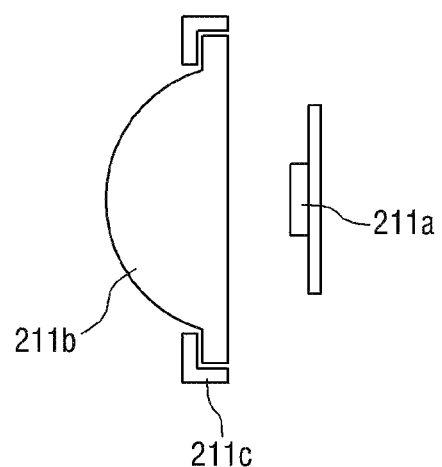
FIG. 4 is a side view of the light source part of the first lamp unit in accordance with the exemplary embodiment of the present invention.

FIG. 3 is a front view of a light source part of the first lamp unit in accordance with the exemplary embodiment of the present invention. FIG. 4 is a side view of the light source part of the first lamp unit in accordance with the exemplary embodiment of the present invention. Again it should be noted that although only one light source part 211 among the light source parts 211 to 215 included in the first lamp unit 210 is illustrated in FIGS. 3 and 4, the other light source parts 212 to 215 may have the same structure as that of the light source part 211, and there may be a difference in the size, installation angle, irradiation direction and the like.

Referring to FIGS. 3 and 4, the light source part 211 may include a light source 211a, a lens 211b, and a housing 211c in which the lens 211b is installed. A light emitting diode may be used as the light source 211a, but it is not limited thereto. Further, a manufacturer name and the like may be represented on one surface of the housing 211c surrounding the lens 211b.

Figure 5:
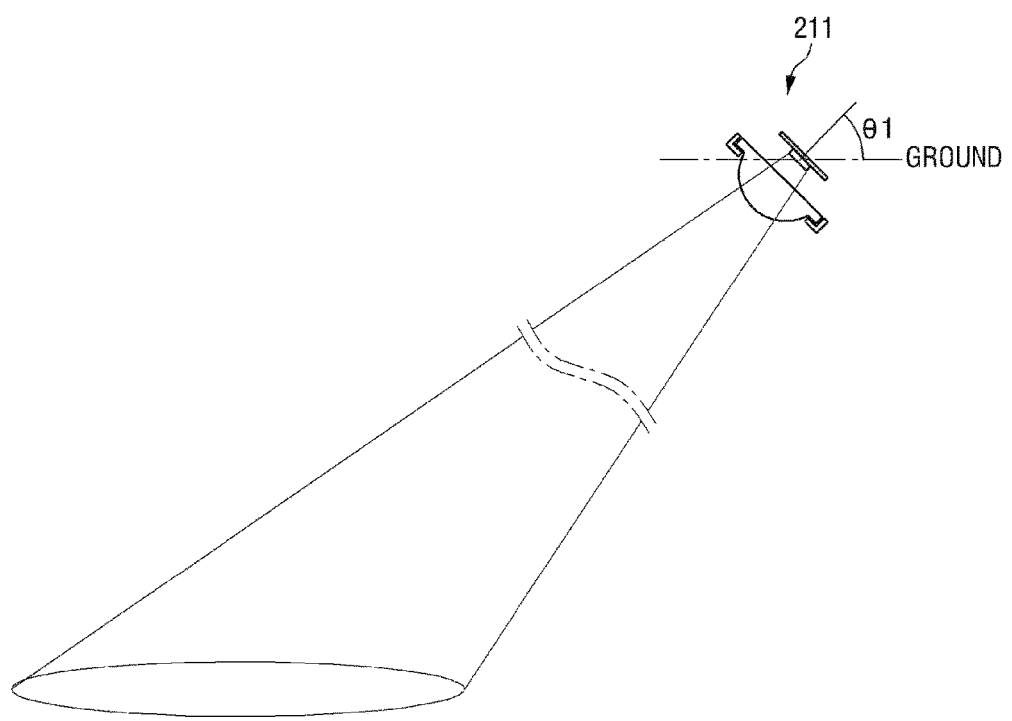
FIGS. 5 and 6 schematically show an installation angle of the light source part of the first lamp unit in accordance with the exemplary embodiment of the present invention.
Figure 6:
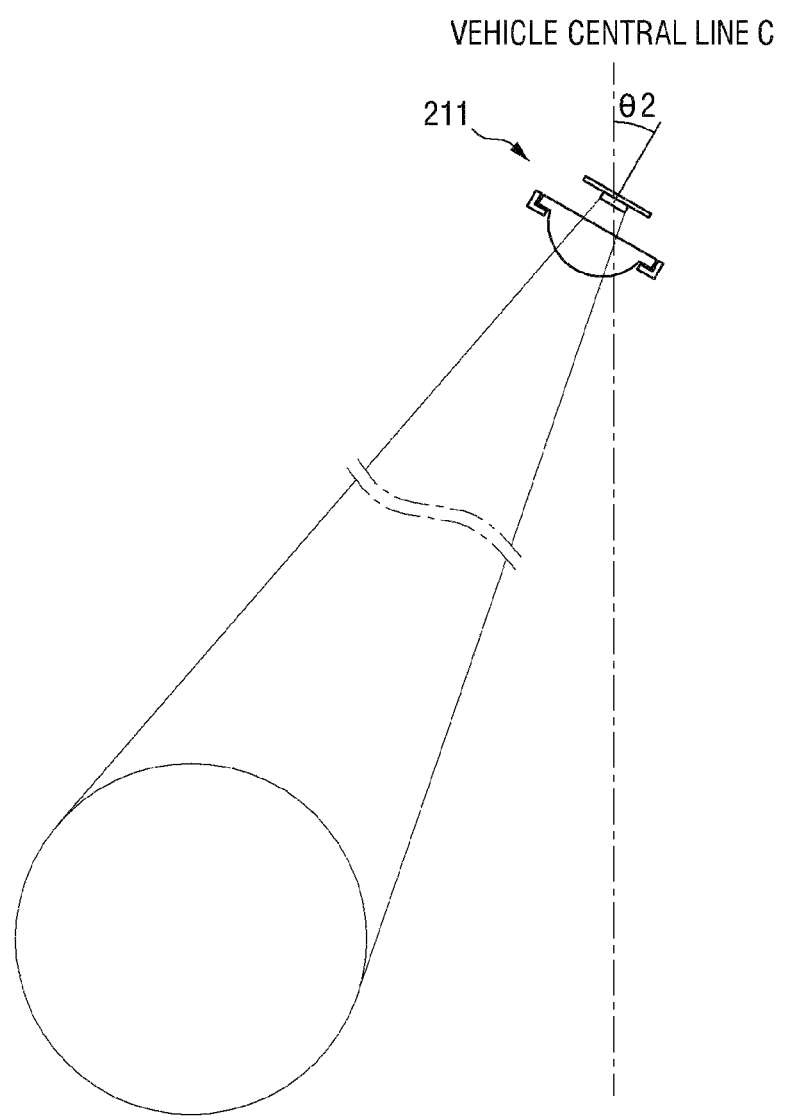

The light source parts 211 to 215 included in the first lamp unit 210 in accordance with the exemplary embodiment of the present invention are installed, as illustrated in FIGS. 5 and 6, to be angled by θ1 from the ground and to be inclined by θ2 from a central line C of the vehicle such that a desired road pattern can be formed in the rear of the vehicle 10. In this case, in FIGS. 5 and 6, θ1 and θ2 may be variously changed according to the road pattern formed by the first lamp unit 210.

Figure 7:
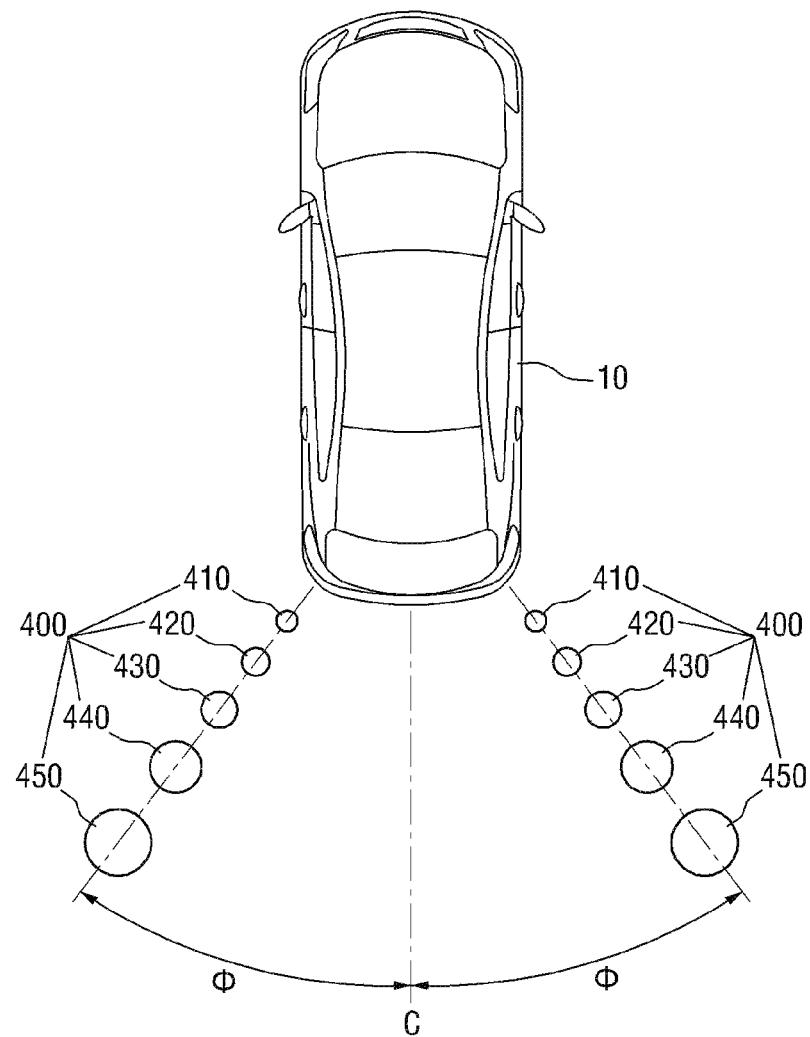
FIG. 7 schematically shows road patterns formed by the first lamp unit in accordance with the exemplary embodiment of the present invention.

FIG. 7 schematically shows road patterns formed by the first lamp unit in accordance with the exemplary embodiment of the present invention. As shown in FIG. 7, road patterns 400 formed by light irradiated from the first lamp unit 210 may be formed such that specific shapes 410 to 450 are arranged in one direction by adjusting the size, installation angle, irradiation direction and the like of the light source parts 211 to 215 included in the first lamp unit 210.

In this case, the size, interval or the like of the shapes 410 to 450 included in the road patterns 400 may be variously changed according to purpose and need. In the exemplary embodiment of the present invention, the shapes 410 to 450 included in the road patterns 400 are circular shapes and have sizes gradually increasing as they go away from the vehicle 10. However, it is merely one example to facilitate understanding of the present invention, and it is not limited thereto. The shapes 410 to 450 may have various shapes and sizes gradually decreasing.

In this case, it can be seen from FIG. 7 that the road patterns 400 are formed on both sides, each having a predetermined angle Φ from the central line C of the vehicle 10. The angle Φ between the central line C of the vehicle 10 and each of the road patterns 400 may be set so that an ambient vehicle approaching from one side behind the vehicle 10 can easily see the road patterns 400, may be set through various tests by a manufacturer or the like, or may be a certain angle set by the driver, without being limited thereto.

Further, the road patterns 400 are formed on both rear sides of the vehicle 10 in the example of FIG. 7, but it is not limited thereto. The road pattern may be formed on only one rear side of the vehicle 10 according to the reversing direction of the vehicle 10.

Meanwhile, the light source parts 211 to 215 included in the first lamp unit 210 of FIG. 2 are arranged in a horizontal direction, and each of the road patterns 400 of FIG. 7 is formed to have the predetermined angle Φ from the central line C of the vehicle 10. In the exemplary embodiment of the present invention, as shown in FIGS. 5 and 6, a desired road pattern may be formed by adjusting the installation angles of the light source parts 211 to 215 included in the first lamp unit 210.

Further, the light source parts 211 to 215 of FIG. 2 are arranged in the horizontal direction. However, it is merely one example to facilitate understanding of the present invention, and it is not limited thereto. The light source parts 211 to 215 may be arranged in various directions according to the layout of the lamp. If the arrangement direction of the light source parts 211 to 215 is changed to form the road patterns 400 of FIG. 7, the installation angle or the like may be also changed.

Referring again to FIG. 2, the second lamp unit 220 may be installed at one side of the first lamp unit 210 to inform an ambient vehicle approaching from one side behind the vehicle 10 of the vehicle state by irradiating light in the form of a road pattern such as characters and shapes, or the like in cooperation with the first lamp unit 210. For example, the first lamp unit 210 may irradiate light of a road pattern in which specific shapes are arranged, and the second lamp unit 220 may irradiate light of a road pattern so as characters and shapes providing a warning to prevent occurrence of a vehicle accident are irradiated. If the vehicle 10 includes a separate device (e.g., warning light) serving as the second lamp unit 220, the second lamp unit 220 may be omitted, and the second lamp unit 220 may operate independently of the first lamp unit 210.

Figure 8:
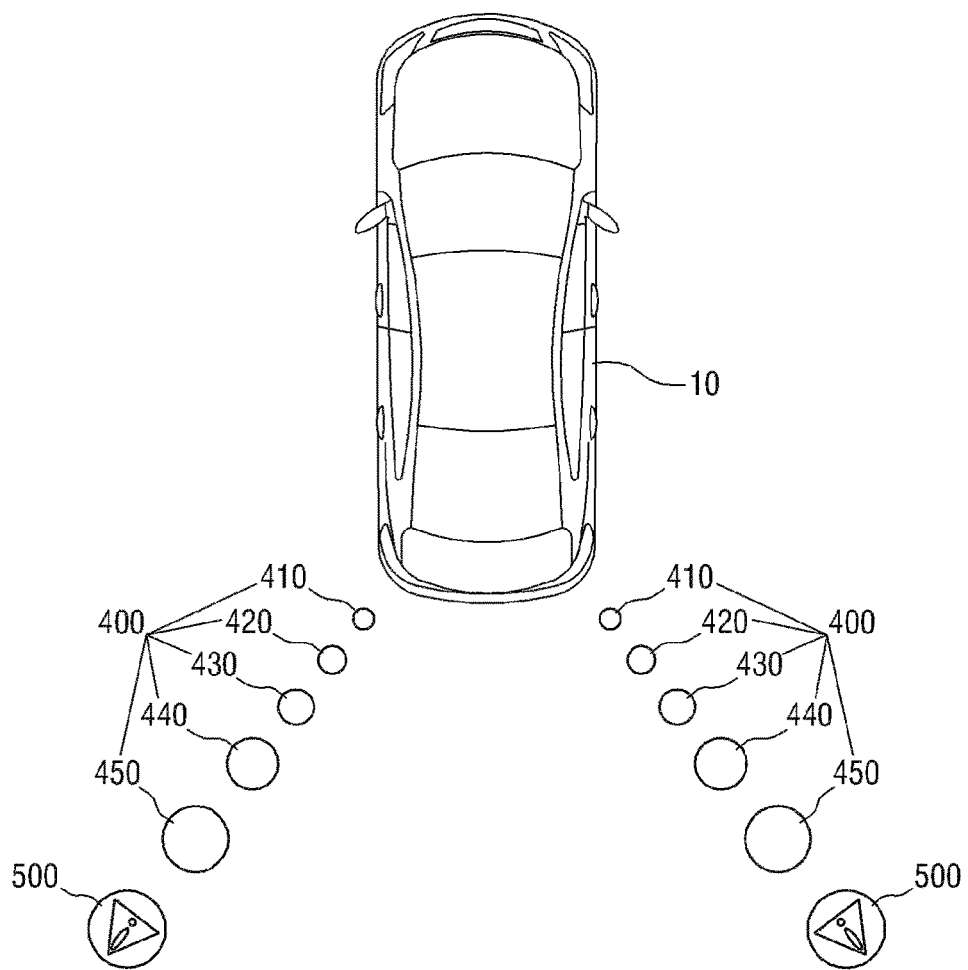
FIG. 8 schematically shows road patterns formed by the first lamp unit and the second lamp unit in accordance with the exemplary embodiment of the present invention.

FIG. 8 schematically shows road patterns formed by the first lamp unit and the second lamp unit in accordance with the exemplary embodiment of the present invention. As shown in FIG. 8, it can be seen that each of the road patterns 400 formed by the first lamp unit 210 is formed in one direction from the rear side of the vehicle 10, and each of road patterns 500 formed by the second lamp unit 220 is formed at one side of each of the road patterns 400 formed by the first lamp unit 210 and has a shape to provide a warning to an ambient vehicle. The shape of the road patterns 500 formed by the lamp units 200 may be selected by the driver to have various shapes according to the situation through a switch, a graphical user interface selection, or the like installed in the vehicle 10.

The control unit 300 may control the road pattern by controlling the lamp units 200 according to the detection results of the detection unit 100. For example, when the vehicle 10 is stopped, once the driver selects a shift position for reverse movement of the vehicle 10, the control unit 300 may control that the first lamp unit 210 to form the road patterns by turning on and off the first lamp 210. When the vehicle 10 begins to move backward, the control unit 300 control the first lamp unit 210 the road patterns 400 maintain an ON state.

Figure 9:
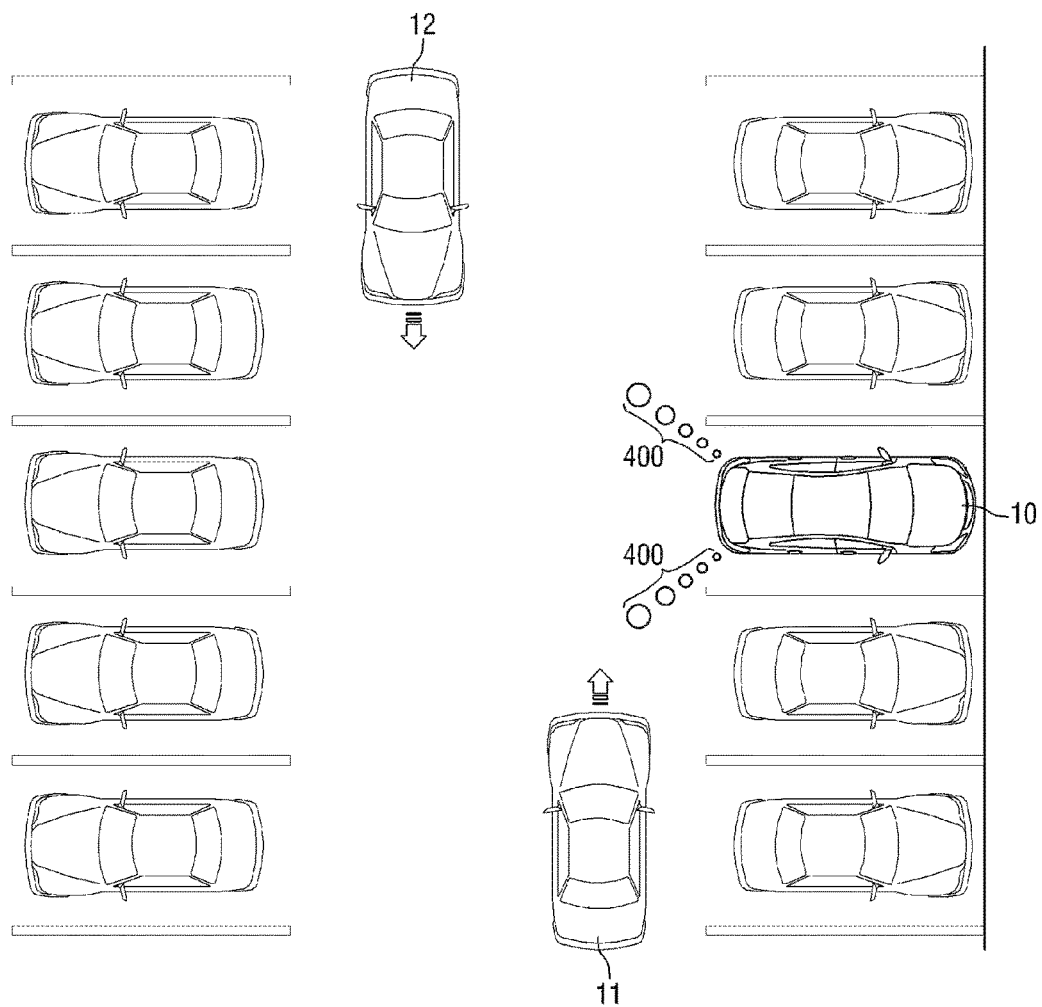
FIGS. 9 and 10 schematically show road patterns in a reverse movement of a vehicle in accordance with the exemplary embodiment of the present invention.
Figure 10:
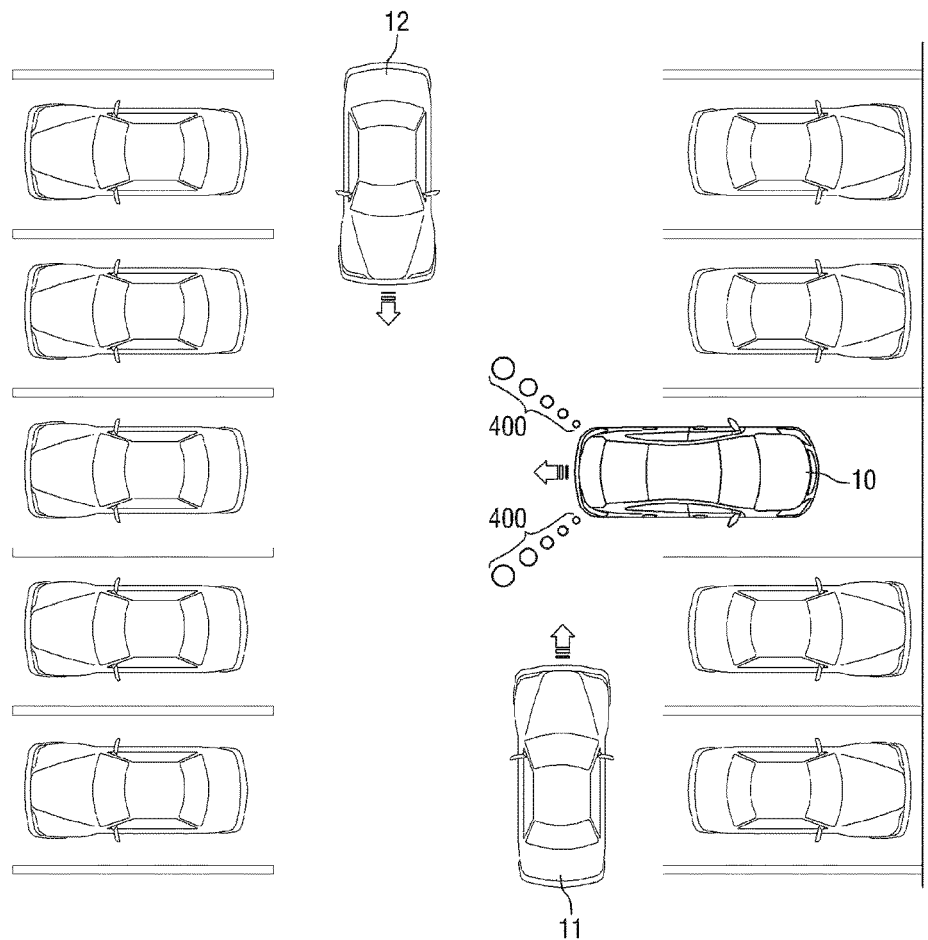

That is, the control unit 300 may send and block current to at least one of the first lamps to illuminate the road patterns 400 on the road when the vehicle 10 is stopped once the driver selects a shift stage for reverse movement of the vehicle 10 as illustrated in FIG. 9, and the road patterns 400 maintain an ON state once the vehicle 10 is reversing as illustrated in FIG. 10.

In this case, turning on and off the road patterns 400 as illustrated in FIG. 9 and maintaining an ON state of the road patterns 400 as illustrated in FIG. 10 allow a driver of the ambient vehicle to distinguish the situations by forming different road patterns which best fit a particular situation, but it is not limited thereto. In FIGS. 9 and 10, all road patterns may maintain an ON state or OFF state.

Accordingly, ambient vehicles 11 and 12 approaching from behind the vehicle 10 may be informed of the reverse movement and make preparations when the road patterns 400 are turned on and off, and may take an appropriate action when the vehicle 10 begins to move backward.

Further, in order to prevent accidents from occurring when a driver opens a door and an the driver gets out as well, i.e., for the safety of the driver who gets out of the vehicle 10 when the door of the vehicle 10 is open in a parked or stopped state of the vehicle 10, the control unit 300 may control the first lamp unit 210 to form certain road patterns 400 pertaining to that event. Also in this case, the road patterns 400 may maintain an ON or OFF state. Further, the control unit 300 may additionally turn on the second lamp unit 220 when the driver gets out the vehicle 10, thereby preventing death and injury to the driver.

Figure 11:
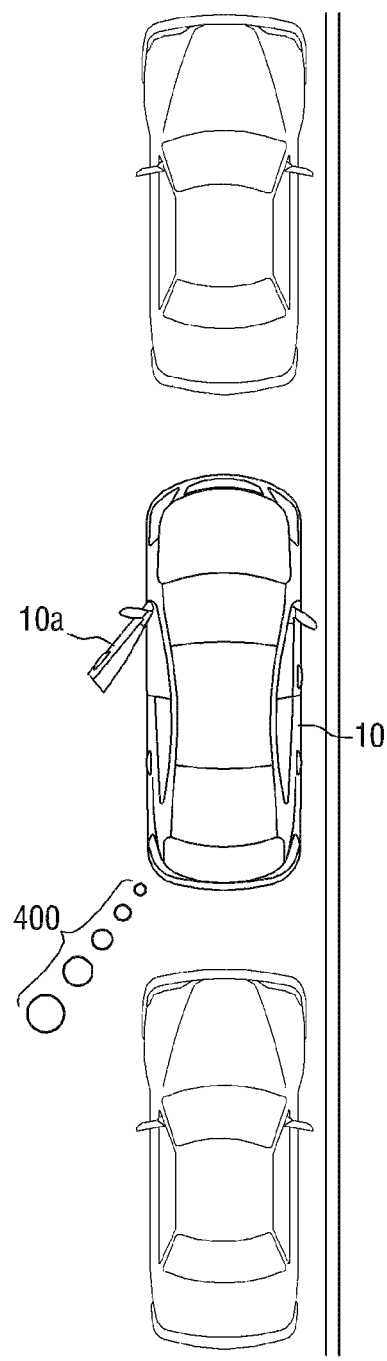
FIGS. 11 to 14 schematically show road patterns when a door is open in accordance with the exemplary embodiment of the present invention.
Figure 12:
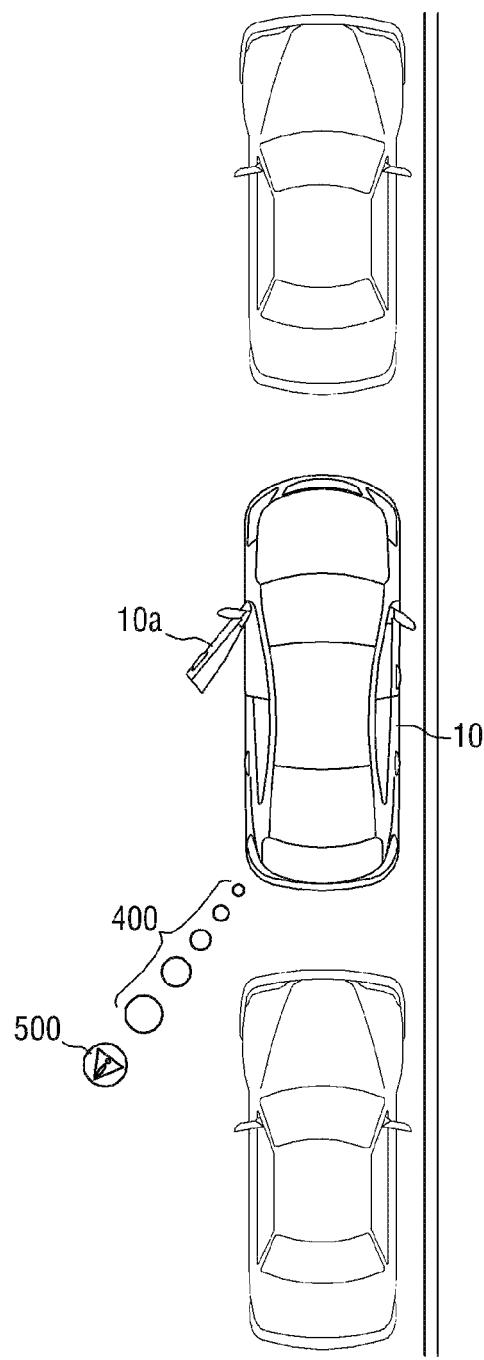

That is, when a door 10a is opened when the vehicle 10 is parked or stopped on one side of the road as illustrated in FIG. 11, the control unit 300 may control the first lamp unit 210 to illuminate the road pattern 400 on the side of the vehicle in which traffic is travelling. Similarly, as illustrated in FIG. 12, the road pattern 500 formed by the second lamp unit 220 in addition to the road pattern 400 formed by the first lamp unit 210 may be additionally formed.

Figure 13:
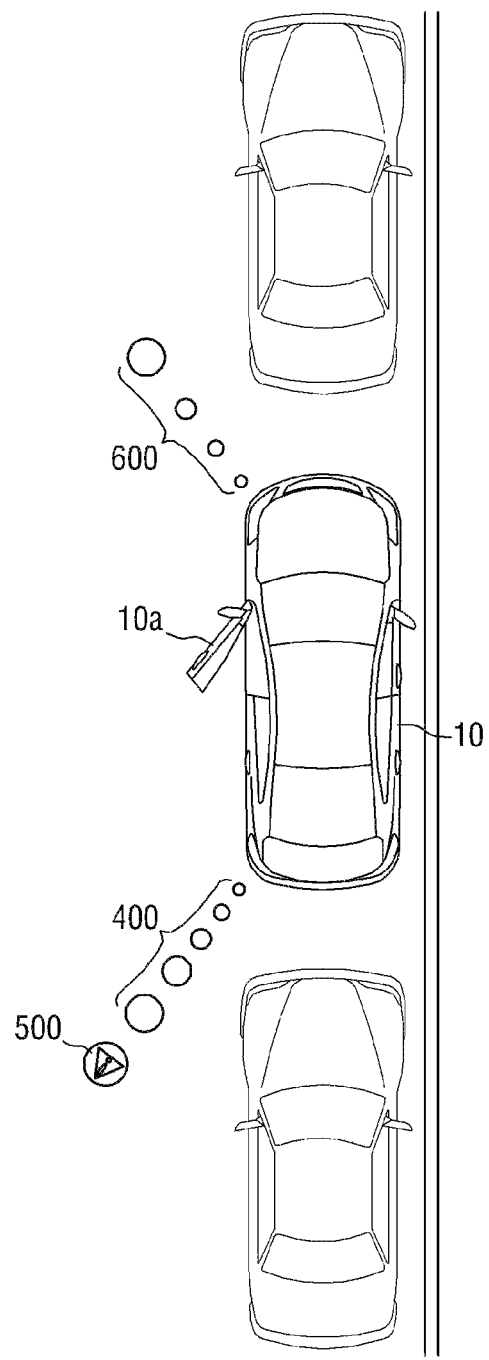

Further, when the vehicle is parked on a road such as a narrow alley, as illustrated in FIG. 13, a road pattern 600 similar to the road pattern formed by the first lamp unit 210 may be also formed in front of the vehicle 10 as well as in the rear of the vehicle 10. This is because a vehicle accident may occur due to a vehicle approaching in front of the vehicle as well as a vehicle from approaching behind of the vehicle 10 when the width of the road is narrow.

For this, in the exemplary embodiment of the present invention, the first lamp unit 210 may be installed on one front side of the vehicle 10 in addition to one rear side of the vehicle 10. Also when the first lamp unit 210 is installed on the front side of the vehicle 10, the road pattern 600 may be formed such that the specific shapes are arranged at a predetermined angle from the central line C of the vehicle 10 similarly to the case where the first lamp unit 210 is installed on the rear side of the vehicle 10. According to the situation, not only the first lamp unit 210 but also the second lamp unit 220 may be installed on one front side of the vehicle 10.

Figure 14:
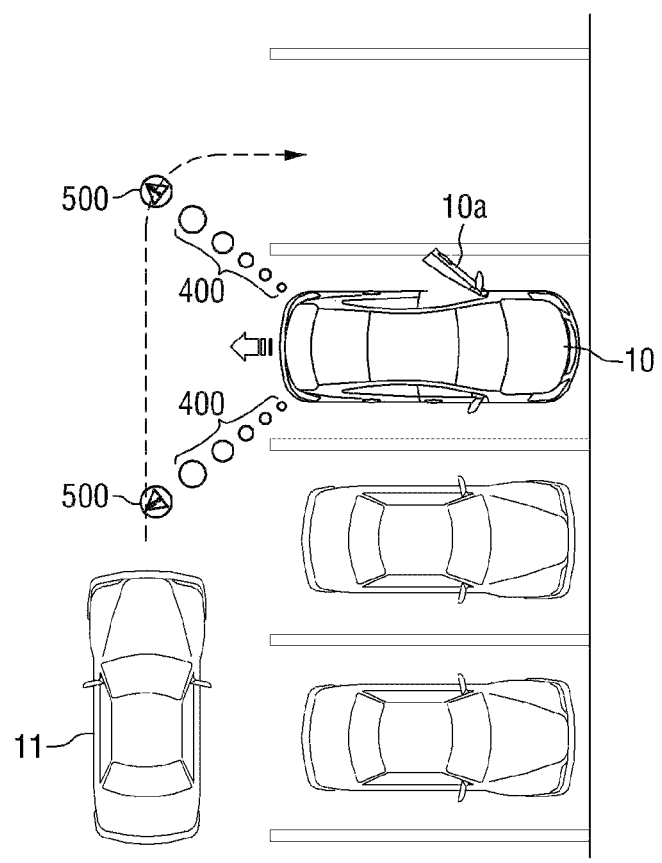

Meanwhile, also in a case where the vehicle 10 is parked in the parking lot instead of one side of the road, as illustrated in FIG. 14, the road patterns 400 and 500 may be formed by the first lamp unit 210 and the second lamp unit 220, thereby preventing a vehicle accident from occurring due to the ambient vehicle 11 when the driver opens the door 10a and gets off the vehicle 10. Also in the case of FIG. 14, all of the road patterns 400 and 500 are formed by the first lamp unit 210 and the second lamp unit 220. However, it is merely one example to facilitate understanding of the present invention, and it is not limited thereto. That is, only the road patterns 400 or the road patterns 500 may be formed.

Figure 15:
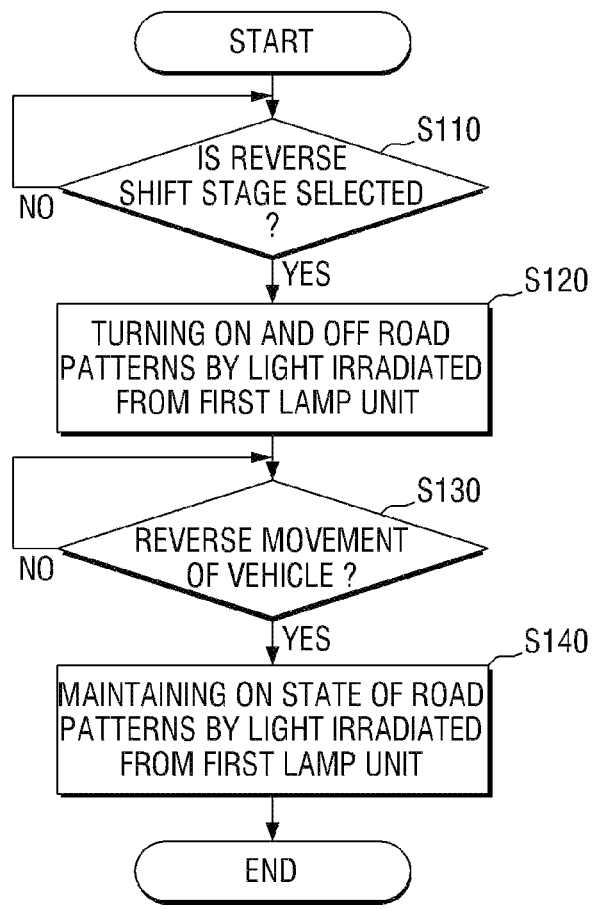
FIG. 15 is a flowchart showing a method for controlling a road pattern in a reverse movement of a vehicle in accordance with the exemplary embodiment of the present invention.

FIG. 15 is a flowchart showing a method for controlling a road pattern in a reverse movement of a vehicle in accordance with the exemplary embodiment of the present invention. As shown in FIG. 15, in the method for controlling a road pattern in a reverse movement of the vehicle 10, first, the detection unit 100 detects whether a reverse shift stage for the reverse movement of the vehicle 10 is selected (step S110).

If the reverse shift stage is selected and the vehicle 10 is stopped, the control unit 300 controls the first lamp unit 210 so that each of the road patterns 400 are formed in one direction behind the vehicle 10 (step S120). In this case, the road patterns 400 formed at step S120 may be turned on and off at predetermined intervals. When the reverse movement of the vehicle 10 is detected (step S130), the control unit 300 controls such that the road patterns 400 formed by the first lamp unit 210 maintain an ON state (step S140).

In the above case, the road patterns 500 are not formed by the second lamp unit 220 in FIG. 15, but it is not limited thereto. In steps S120 and S140 of FIG. 14, the road patterns 500 formed by the second lamp unit 220 may be formed in addition to the road patterns 400 formed by the first lamp unit 210.

Meanwhile, the case where the vehicle is reversing by selecting the reverse shift stage has been illustrated in FIG. 15, but it is not limited thereto, and it may be also applied to a case where the vehicle is reversing due to an external factor (e.g., inclined road). The reverse movement due to an external factor may include both a case where the reverse shift stage is selected and a case where the reverse shift stage is not selected. In the reverse movement due to an external factor when the reverse shift stage is not selected, steps S110 and S120 may be omitted.

Figure 16:
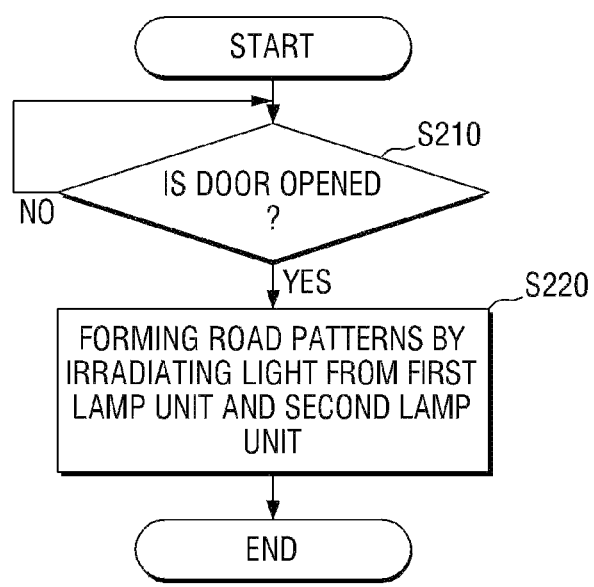
FIG. 16 is a flowchart showing a method for controlling a road pattern when a door is open in accordance with the exemplary embodiment of the present invention.

FIG. 16 is a flowchart showing a method for controlling a road pattern when a door is opened in accordance with the exemplary embodiment of the present invention. FIG. 16 shows an example of the method for controlling a road pattern when a door is open while the vehicle 10 is parked or stopped on one side of the road or in the parking lot. As shown in FIG. 16, in the method for controlling a road pattern when a door is open in accordance with the exemplary embodiment of the present invention, first, the detection unit 100 detects whether the door 10a of the vehicle 10 is opened (step S210).

When it is detected that the door 10a of the vehicle 10 is opened, the control unit 300 controls the first lamp unit 210 and the second lamp unit 220 to form the road patterns 400 and 500 (step S220). In this case, when all of the road patterns 400 and 500 are formed by the first lamp unit 210 and the second lamp unit 220 when the door 10a is opened has been described in FIG. 16. However, the road patterns may be formed by only one of the first lamp unit 210 and the second lamp unit 220, and the road patterns may be formed by installing the first lamp unit 210 or the second lamp unit 220 on the front side of the vehicle 10 as well as the rear side of the vehicle 10.

As described above, in the automotive lamp and the method for controlling the automotive lamp in accordance with the exemplary embodiment of the present invention, in a situation where the vehicle 10 is reversing or the door is open when an ambient vehicle is approaching from one side behind the vehicle 10, light forming a road pattern indicating the reverse movement of the vehicle or opening of the door is irradiated to an area behind the vehicle to prevent accidents from occurring. Accordingly, although the driver of the ambient vehicle does not see a reversing lamp or opened door itself, the driver of the ambient vehicle can see the road patterns illuminated by the present invention and thus make preparations.

In the automotive lamp and the method for controlling the automotive lamp in accordance with the present invention, at least one of the following effects can be obtained. By irradiating light of a road pattern indicating the reverse movement of the vehicle to an area behind the vehicle, even when an ambient vehicle approaching from one side behind the vehicle does not see a reversing lamp, it allows the ambient vehicle to see the reverse movement of the vehicle and make preparations accordingly. Further, by irradiating light of a road pattern indicating the reverse movement of the vehicle and light of a road pattern indicating that there is a dangerous situation or event or factor, it is possible to further prevent occurrence of a vehicle accident. Furthermore, by irradiating light of a road pattern indicating that the door of the vehicle is open, it allows an ambient vehicle to easily be informed that a driver is exiting the vehicle.

The effects of the present invention are not limited thereto, and other effects of the present invention can be apparently understood from the description of claims.

Although the above exemplary embodiment is described as using a plurality of units to perform the above process, it is understood that the above processes may also be performed by a single controller or unit. Furthermore, the control logic of the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

The invention claimed is:

1. An automotive system lamp, comprising:
 a detection unit configured to detect whether a side door is opened when a vehicle is parked or stopped; and
 a lamp unit disposed in the rear lamp housing, configured to irradiate light forming a road pattern on one side of the vehicle, when the side door is opened,
 wherein the side is the door opened side.

2. The automotive lamp of claim 1, wherein when the lamp unit includes a plurality of light sources, and the road pattern includes a plurality of shapes which are formed by the light sources respectively, and arranged in one direction from the vehicle.

3. The automotive lamp of claim 1, wherein the road pattern irradiated by lamp unit angled by about θ1 from the ground, and inclined by about θ2 from a central line C of the vehicle.

4. The automotive lamp of claim 3, wherein the shapes included in the road pattern have sizes that gradually increase or decrease as the distance from the vehicle increases.

5. The automotive lamp of claim 4, wherein size and position of the shapes are determined by at least one of size, installation angle, or focal length of the light sources.

6. The automotive lamp of claim 1, wherein the road pattern is formed to have a predetermined angle between one side behind the vehicle and a central line of the vehicle.

7. The automotive lamp of claim 1, wherein the lamp unit is disposed on the exterior of the vehicle at an exterior position.

8. The automotive lamp of claim 1, wherein the road patterns are formed on both sides of the vehicle.

9. The automotive lamp of claim 1, wherein the each of light sources arranged at about an angle of θ1 from the ground.

10. The automotive lamp of claim 1, wherein the each of light sources arranged at about an angle of θ2 from the central line C of the vehicle.

11. The automotive lamp of claim 1, wherein a control unit is configured to turn on and off the lamp unit by detecting whether the door is opened.

12. The automotive lamp of claim 1, wherein the plurality of light sources are arranged in a horizontal direction.

13. The automotive lamp of claim 1, wherein the light source is a light emitting diode.

14. The automotive lamp of claim 1, wherein the shape of a road pattern is circular.

15. The automotive lamp of claim 1, wherein the lamp unit is disposed adjacent to a stop lamp.

16. The automotive lamp of claim 1, wherein the lamp unit is disposed adjacent to a blinker.

17. The automotive lamp of claim 16, wherein the lamp unit is disposed below the blinker.

* * * * *